United States Patent [19]
Tippy

[11] 3,922,781
[45] Dec. 2, 1975

[54] CUT AND HOLD PLIERS

[76] Inventor: William Tippy, 10131 Jeans St., Philadelphia, Pa. 19116

[22] Filed: Aug. 7, 1974

[21] Appl. No.: 495,508

[52] U.S. Cl. .................................................. 30/124
[51] Int. Cl.² ........................................ B26B 17/04
[58] Field of Search ...................... 30/124, 134, 135

[56] References Cited
UNITED STATES PATENTS

| 438,292 | 10/1890 | Snyder | 30/135 |
| 2,553,697 | 5/1951 | Zacrep | 30/135 |
| 3,842,500 | 10/1974 | Cassel | 30/124 |

FOREIGN PATENTS OR APPLICATIONS

| 1,443,560 | 5/1966 | France | 30/124 |

*Primary Examiner*—Al Lawrence Smith
*Attorney, Agent, or Firm*—Stuart E. Beck

[57] ABSTRACT

A cut and hold pliers in which the distal end of a wire which is cut is retained against one of the cutting surfaces by an elongated resilient member.

13 Claims, 8 Drawing Figures

U.S. Patent  Dec. 2, 1975  3,922,781
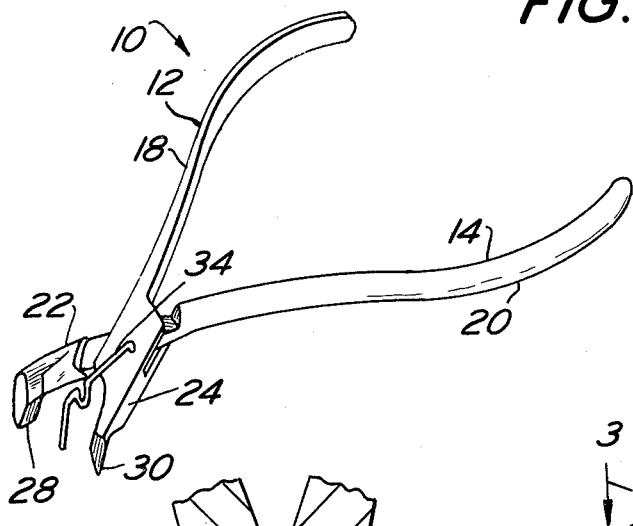
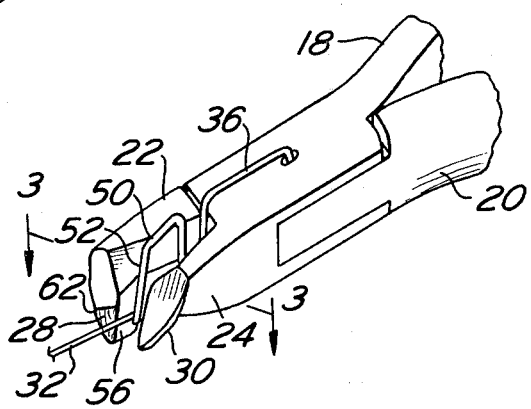
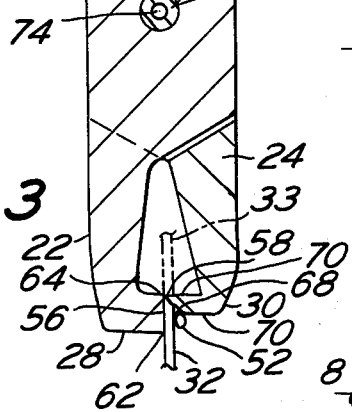

CUT AND HOLD PLIERS

This invention relates to cut and hold pliers and more particularly to a cut and hold pliers that has applications in the medical, surgical, dental and allied fields.

In dentistry teeth are straightened by the use of metal bands and wires. The bands are placed on the teeth and are interconnected by the wires. By selective tensioning of the wires, the teeth can be moved until they are placed in satisfactory locations.

During the procedures in which the wires are applied, adjusted and tightened or removed, they are cut to appropriate size by the dentist. Nearly all cutting takes place while the wire is within the patient's mouth. Serious problems have been encountered when the distal end of the wire which is to be cut is not large enough to be grasped by the dentist. The problem results from the fact that the act of cutting turns the distal end of the cut wire into a sharp particle which is propelled into the tissue in the patient's mouth.

This problem has been solved to some extent by using pliers that cut the wire with a shearing force with the distal end of the cut wire being gripped by the jaws of the pliers as the wire is cut.

The shear type cut and hold pliers known heretofore have been of limited utility to dentists because they are not adjustable to accommodate different sized wires. This is because the gripping faces are so positioned and dimensioned with respect to the cutting edges on the blades to enable the distal end of the wire to be gripped just as the cut is being completed. The use of larger diameter wire than that for which the cutter is designed will result in the wire not being cut through. This is because the gripping jaws will engage the wire before the cutting edges have come together the requisite amount in order to accomplish the cut. On the other hand, if a wire has a diameter less than that for which the cutter is designed is cut, the distal end will fly from the pliers before the gripping jaws can engage it.

Further, in order to have a successful shearing tool, the shearing blades must be mounted so that they slide passed each other. Thus, it is essential in such a tool that the means which support the shearing blades for movement passed each other by carefully and accurately made since relative movement of the shearing blades will interfere with the cutting action. This causes substantial expense since if the blades are not close enough to shear the wire, they will merely bend it.

Further, the shear and hold pliers generally leave a short length of wire protruding from the band after the distal end is removed. While this protrusion may be only on the order of about one thirty-second of an inch, it is large enough to cause pain and annoyance.

The pliers disclosed herein avoid these problems by presenting a cut and hold pliers which uses a cutting edge and anvil cutting members in which the distal end of the wire to be cut is supported and engaged by a resilient member prior to its being severed so that it cannot fly into the tissue in the patient's mouth. Further, dental wire of any size can be cut.

Still further, the members supporting the edge and anvil may be interconnected by a means having tolerances which are more liberal than that which are allowable in the shear and hold pliers to that even if the edge is permitted to move relative to the anvil surface, cutting can still be accomplished.

Furthermore, the invention comprises a resilient member which is supported by the pliers and which has a leg for engaging the distal end of the wire prior to its actually being severed so that it cannot fly away. The resilient member enables the pliers to engage the distal end of the wire prior to its beng cut without regard to its size.

The invention relates in one aspect to a dental pliers of the type comprising two arms which are pivotally connected to each other to define two handles and two jaws wherein each of the jaws include cooperable means for cutting dental wire. A resilient elongated member is coupled to the pliers. A portion of one of the arms is engageable with the resilient member to urge it toward the jaw on the other arm so that the resilient member can cooperate with the means for cutting the dental wire to prevent the distal end of the wire from flying away form the pliers after it is cut.

In other aspect the invention relates to a resilient elongated member for use in a dental pliers of the type used to cut wire. The member comprises an elongated body portion with a downwardly extending bight formed on end. A first leg is coupled to the bight at an end thereof which is spaced from the body portion. A downwardly and longitudinally extending second leg is coupled to the first leg. The second leg is of sufficient length of extend between the cutting members of the pliers. Means are provided for coupling the member to the pliers.

For the purpose of illustrating the invention, there are shown in the drawings forms which are presently preferred, it being understood, however, that this invention is not limited to the precise arrangements and instrumentalities shown.

FIG. 1 is a left hand perspective view of a pliers constructed in accordance with a presently preferred form of the invention.

FIG. 2 is a perspective view of a portion of the pliers illustrated in FIG. 1 on a larger scale.

FIG. 3 is a sectional view taken along line 3—3 of FIG. 2.

FIG. 4 is a right hand perspective view of the pliers illustrated in FIG. 2.

FIG. 5 is a side elevational view of an elongated resilient member which is used to retain the distal end of a wire.

FIG. 6 is a top plan view of the wire illustrated in FIG. 5.

FIG. 7 is a sectional view taken along line 7—7 of FIG. 5.

FIG. 8 is a sectional view taken along line 8—8 of FIG. 5.

Now referring to the drawings for a detailed description of the invention, a pliers 10 constructed in accordance with a presently preferred form thereof is illustrated in FIG. 1. It comprises two arms 12 and 14 which are pivotally connected to each other by a pivot pin 16 as shown in FIG. 3. The pivot pin divides each arm into handles 18 and 20 and jaws 22 and 24.

The distal end of each jaw 22 and 24 supports downwardly and forwardly extending angularly disposed beaks 28 and 30. The beaks comprise cooperable means for cutting dental wire as will be explained more fully herein. A resilient elongated member 34 connected to the pliers cooperates with the cutting means to retain the distal end 32 of a wire 33 in contact with one of the cutting means.

As best seen in FIGS. 5–8, elongated member 34 may be a resilient elongated wire which has a diameter of approximately one-sixteenth of an inch. It may be bent to include a relatively straight body portion 36 with a downwardly depending tail 38 at one end. Preferably, the tail is angularly disposed with respect to the body portion 36 so that an acute angle, preferably on the order of about 87° is defined therebetween.

A bight 42 having arms 44 and 46 is located at the other end of body portion 36. Bight 42 lies in a plane which is laterally off-set from the plane defined by body portion 36 and tail 38 by an angle of approximately 5° (FIG. 7).

Leg 50 which is coupled to arm 46 is disposed at an angle of about 25° relative to the longitudinal axis of body portion 36 in a generally downward and forward direction as best seen in FIG. 5. Further, it is preferably, laterally disposed at an angle of about 10° with respect to the longitudinal axis of body portion 38 in generally the same lateral direction as bight 42 (FIG. 6).

Leg 52 is connected to leg 50 and is disposed at an angle of about 80° from the longitudinal axis of body portion 36 in a generally downward and forward direction as best seen in FIG. 5. Further, it is laterally disposed at an angle of about 10° from the plane defined by tail 38 and body portion 36 in a plane which is directed generally away from the plane defined by bight 42 (FIG. 8).

In one embodiment of resilient elongated member 34, body portion 36 had a length of one-half inch and tail 38 was three-sixteenths of an inch long. Leg 44 was one-quarter inch long while leg 46 was five thirty-seconds of an inch in length. The distance between legs 44 and 46 was seven thirty-seconds of an inch and the distance between leg 46 and the juncture of legs 50 and 52 was five thirty-seconds of an inch. Leg 52 was seven-sixteenths of an inch long. The forgoing dimensions were found to be suitable for use with a pliers having jaws of a particular size. It should be understood that it is within the scope of this invention to vary the angular dispositions and lengths of the parts of the resilient member 34 to accommodate a somewhat different pliers.

The configuration of the resilient member 34 enables it to be frictionally retained on the pliers and to provide positive tensioning and gripping forces on the distal end 32 of the wire 33 as it is being cut.

Referring to FIGS. 2 and 3 the beaks 28 and 30 are shaped to define an anvil 56 and a cutting edge 58. The anvil 56 on beak 28 is defined by front and rear edges 62 and 64.

Cutting edge 58 on beak 30 is defined by a camming surface 68 and rear face 70 on beak 30 so that a V-shaped opening is formed between the camming surface and anvil.

The cutting edge 58 and anvil 56 cooperate to define means for cutting the dental wire.

The resilient elongated member 34 may be attached to the pliers by placing tail 38 in a hole 74 which is formed in arm 12. Preferably, the hole 74 is concentric with the pivot pin 16. Placing tail 38 in the pivot pin assures that member 34 will remain along jaw 24 as the handles are opened and closed. The various components of resilient elongated member 34 are dimensioned and angularly disposed with respect to each other as described earlier so that body portion 36 lies along the top surface of the jaws, bight 42 lies along the inside surface of jaw 24 and the lower part of leg 52 lies generally along camming surface 62. As best seen in FIG. 4 a portion of leg 52 extends into the opening between anvil 56 and cutting edge 58. Leg 52 may be somewhat flattened to provide a greater surface area to contact the distal end than would be available if it were circular in cross sections.

The angular relationship between body portion 36 and tail 38 causes the body portion to lie along the top surface of the jaws. Bight 42 bears against the inner surface of jaw 24 by virtue of its angular disposition with respect to tail 38.

The angular relation between bight 42 and legs 50 and 52 causes leg 52 to lie along camming surface 68 between anvil 56 and cutting edge 58 and causes leg 52 to be urged against anvil 56 with increasing force as the jaws are closed to cut the wire.

The beaks may be disposed at an angle of about 60° with respect to the plane of arms 12 and 14 to permit access to the rear portion of the patient's mouth. As illustrated in the drawings, the rear edge 64 and cutting edge 58 may be disposed at an angle of about 60° with the plane in which arms 12 and 14 are disposed. They may also be arranged so that the cutting edge 58 is aligned with rear edge 64. This eliminates any likelihood that a protruding wire will remain after the distal end is cut. This is because the rear edge and the cutting edge can be placed against the appliance to which the wire is connected.

It is contemplated that the distal end 32 of the wire 33 which is cut will be on the side of the beaks which is remote from the pivot 16 as shown so that while working toward the rear of a patient's mouth the dentist will be able to see and accurately locate the cutting edge with respect to the appliance. However, it is within the scope of this invention to reverse the disposition of leg 52, cutting edge 58 and camming surface 68 so that the cutting edge 58 is in alignment with front edge 62 and the distal end of the wire is supported by leg 52 on anvil 56 near rear edge 64. This modification of design is particularly useful for cutting wires near the front of a patient's mouth.

In use, the pliers are placed over the wire 33 so that the wire is disposed between anvil 56 and leg 52. As the cutting edge approaches the anvil, leg 52 grips the wire under the force applied to it by camming surface 68. As the wire is cut the distal end 32 is retained against anvil 56 by leg 52. The tension on leg 52 is at its maximum when the cut is complete since cutting edge 58 is against anvil 56 and leg 52 is being urged into the V-shaped notch between the anvil and camming surface.

It should be noted that even if play should develop in the joint comprising pivot pin 16 to the extend that the cutting edge 58 shifts with respect to anvil 56 the tool will still be able to cut wire since cutting can be achieved anywhere along anvil 56.

Further, since the elongated resilient member 34 is retained in hole 68 by the frictional forces between tail 30 and the side walls of the hole, it can be easily removed from the pliers to be cleaned.

Still further, it sould be appreciated that it is not critical to the invention that the retaining means be supported at the pivot pin 16. Thus, it is within the contemplated scope of this invention that the retaining means can be supported on the pliers in any convenient location as long as the results of the invention as defined herein are accomplished.

Thus, while the invention has been described with reference to a particular form thereof, it is apparent that many other forms and embodiments will be obvious to those skilled in the art in view of the foregoing description. Thus, the scope of the invention should not be limited by that description but, rather, only by the scope of the claims appended hereto.

I claim:

1. In a dental pliers of the type comprising two arms which are connected to each other by a pivot member to define two handles and two jaws, the improvement comprising, an anvil on one of said jaws and a cutting edge on said other jaw, said anvil and said cutting edge being cooperable to cut a wire, said cutting edge being defined by a face and caming surface, said camming surface being angularly disposed with respect to said anvil when said jaws are closed so that said camming surface and said anvil define a generally V-shaped opening, a resilient elongated member, said member including a means for coupling it to said pliers and a leg, said leg lying along said camming surface and extending into the opening between said cutting edge and said anvil when said jaws are open so that when said jaws are closed on a wire said camming surface urges said leg toward said anvil to engage the wire between said leg and said anvil before being cut to enable said pliers to be moved along the wire while it is so engaged, and said leg is operative to retain the distal end of the wire on said anvil after it is cut.

2. A dental pliers as defined in claim 1 wherein a bight is disposed in said elongated resilient member intermediate said coupling means and said leg, said bight bearing against the jaw on which said cutting edge is located to support said leg as said leg retains the distal ends of the cut wire.

3. A dental pliers as defined in claim 1, wherein said anvil includes an edge, said cutting edge including a face, and said anvil edge abuts said face when dental wire is cut so that said face can be placed close to a dental appliance to which the wire is connected to substantially eliminate an exposed wire end in a patient's mouth.

4. A dental pliers as defined in claim 2, an opening in said pliers, said opening being substantially coaxial with said pivot pin, and the end of said elongated resilient member remote from said leg is received in and is retained in said opening.

5. A dental pliers as defined in claim 3 wherein said cutting edge and said edge of said anvil are disposed at an angle of about 60° from a plane defined by said arms.

6. A dental pliers as defined in claim 3 wherein said anvil edge and said face are disposed between said pivotal connection and said leg.

7. A resilient elongated member for use in a dental pliers of the type used to cut wire, said member comprising an elongated body portion, a downwardly extending bight formed at one end of said body portion, a first leg coupled to said bight at an end thereof which is spaced from said body portion, said first leg being in substantial alignment with said elongated body portion so that said first leg and said body portion can lie along a surface of the pliers, a downwardly and longitudinally extending second leg coupled to the end of said first leg, said second leg having a distal end of sufficient length to extend into the opening between the cutting members of the pliers, and means for coupling said member to the pliers.

8. A member as defined in claim 7 wherein said means for coupling said member to the pliers comprises a generally downwardly extending tail, said tail being coupled to said body portion at its end remote from said bight.

9. A member as defined in claim 8 wherein said bight is generally planar and is disposed at a lateral angle of about 50 with respect to said tail.

10. A member as defined in claim 7 wherein said first leg extends in a generally downward lateral direction with respect to said body.

11. A member as defined in claim 10 wherein downward direction is an angle of about 25° and said lateral direction is about 10° from said body portion and in the same direction as said bight.

12. A member as defined in claim 10 wherein said second leg extends in a direction which is downward, forward and laterally diverging from said bight.

13. A member as defined in claim 12 wherein said downward direction is at an angle of about 80° and said lateral direction is at an angle of about 10° from the plane defined by body portion and said tail.

* * * * *

UNITED STATES PATENT OFFICE
CERTIFICATE OF CORRECTION

PATENT NO. : 3,922,781
DATED : December 2, 1975
INVENTOR(S) : William Tippy

It is certified that error appears in the above-identified patent and that said Letters Patent are hereby corrected as shown below:

Claim 4, line 1; after "claim 2," insert --including--.

Claim 9, line 3; change "50" to --5°--.

Signed and Sealed this second Day of March 1976

[SEAL]

Attest:

RUTH C. MASON
Attesting Officer

C. MARSHALL DANN
Commissioner of Patents and Trademarks